(12) United States Patent
Hoek et al.

(10) Patent No.: US 8,611,279 B2
(45) Date of Patent: Dec. 17, 2013

(54) METHOD FOR BUILDING SETS OF MOBILE STATIONS IN MIMO SYSTEMS, CORRESPONDING MOBILE STATION, BASE STATION, OPERATION AND MAINTENANCE CENTRE AND RADIO COMMUNICATION NETWORK

(75) Inventors: Cornelis Hoek, Tamm (DE); Thorsten Wild, Stuttgart (DE)

(73) Assignee: Alcatel Lucent, Paris (FR)

( * ) Notice: Subject to any disclaimer, the term of this patent is extended or adjusted under 35 U.S.C. 154(b) by 211 days.

(21) Appl. No.: 13/002,131

(22) PCT Filed: Jul. 23, 2009

(86) PCT No.: PCT/EP2009/059462
§ 371 (c)(1),
(2), (4) Date: Mar. 24, 2011

(87) PCT Pub. No.: WO2010/031621
PCT Pub. Date: Mar. 25, 2010

(65) Prior Publication Data
US 2011/0164668 A1 Jul. 7, 2011

(30) Foreign Application Priority Data
Sep. 19, 2008 (EP) ...................................... 08305575

(51) Int. Cl.
*H04W 4/00* (2009.01)
(52) U.S. Cl.
USPC ............ 370/328; 455/446; 455/450; 370/252
(58) Field of Classification Search
None
See application file for complete search history.

(56) References Cited

U.S. PATENT DOCUMENTS

| 5,886,988 | A | 3/1999 | Yun et al. |
| 2003/0072294 | A1* | 4/2003 | Wei et al. ....................... 370/345 |
| 2004/0037291 | A1* | 2/2004 | Attar et al. ................. 370/395.4 |
| 2004/0038697 | A1* | 2/2004 | Attar et al. ..................... 455/522 |
| 2004/0179469 | A1* | 9/2004 | Attar et al. ..................... 370/208 |

(Continued)

FOREIGN PATENT DOCUMENTS

| CN | 1960213 | 5/2007 |
| CN | 101039501 | 9/2007 |
| EP | 1 784 032 A | 5/2007 |
| WO | WO 98/30047 A | 7/1998 |

OTHER PUBLICATIONS

International Search Report for PCT/EP2009/059462 dated Oct. 28, 2009.

(Continued)

*Primary Examiner* — Bob Phunkulh
(74) *Attorney, Agent, or Firm* — Fay Sharpe, LLP

(57) ABSTRACT

When building sets of mobile stations in a radio communication network, reference signals are transmitted from a base station to at least two mobile stations to determine channel properties of a downlink channel between the base station and the at least two mobile stations. First and second feedback information are determined at the at least two mobile stations respectively, each feedback information comprising a first component indicating a channel quality. The first and the second feedback information are transmitted from the first and second mobile stations to the base station. A mobile station set is built according to the first and the second feedback information at the base station, wherein the channel quality is a parameter of a downlink beam with a largest received carrier power of at least three downlink beams of said downlink channel.

14 Claims, 13 Drawing Sheets

(56) References Cited

U.S. PATENT DOCUMENTS

| | | | |
|---|---|---|---|
| 2004/0179494 A1* | 9/2004 | Attar et al. | 370/332 |
| 2004/0203809 A1* | 10/2004 | Au et al. | 455/450 |
| 2005/0020295 A1* | 1/2005 | Attar et al. | 455/522 |
| 2005/0285803 A1* | 12/2005 | Iacono et al. | 343/702 |
| 2006/0291389 A1* | 12/2006 | Attar et al. | 370/230 |
| 2007/0099666 A1* | 5/2007 | Astely et al. | 455/562.1 |
| 2007/0104152 A1 | 5/2007 | Wild et al. | |
| 2007/0232359 A1* | 10/2007 | Pinheiro et al. | 455/562.1 |
| 2007/0249402 A1 | 10/2007 | Dong et al. | |
| 2007/0249403 A1* | 10/2007 | Gao et al. | 455/562.1 |

OTHER PUBLICATIONS

Chinese Office Action of corresponding Chinese Application No. 200980125660, dated Apr. 3, 2013.

* cited by examiner

METHOD FOR BUILDING SETS OF MOBILE STATIONS IN MIMO SYSTEMS, CORRESPONDING MOBILE STATION, BASE STATION, OPERATION AND MAINTENANCE CENTRE AND RADIO COMMUNICATION NETWORK

This application is a U.S. national filing of PCT/EP2009/059462 which is based on a priority application EP 08 305 575.6, both of which are hereby incorporated by reference.

FIELD OF THE INVENTION

The invention relates to a method for building sets of mobile stations in a radio communication network, said method comprising the steps of:
transmitting reference signals from a base station for being able to determine channel properties of a downlink channel between said base station and at least two mobile stations; receiving said reference signals by said at least two mobile stations; determining a first feedback information at a first one of said at least two mobile stations and a second feedback information at a second one of said at least two mobile stations comprising each a first component indicating a channel quality of a downlink beam with a largest received carrier power of at least three downlink beams of said downlink channel and a second component indicating said downlink beam with said largest received carrier power; transmitting said first feedback information and said second feedback information from said first one and said second one of said at least two mobile stations to said base station; receiving said first feedback information and said second feedback information at said base station and building a mobile station set of at least two of said at least two mobile stations according to said first feedback information and said second feedback information at said base station; to a base station for use in a radio communication system, said base station being a serving base station of at least two mobile stations, said base station further comprises: means for transmitting reference signals for being able to determine channel properties of a downlink channel between said base station and said at least two mobile stations; means for receiving a first feedback information of a first one of said at least two mobile stations and a second feedback information of a second one of said at least two mobile stations each comprising a first component indicating a channel quality of a downlink beam with a largest received carrier power of at least three downlink beams of said downlink channel and a second component indicating said downlink beam with said largest received carrier power; and means for building a mobile station set of at least two of said at least two mobile stations according to said first feedback information and said second feedback information at said base station; to a mobile station for use in a radio communication system, said mobile station being served by a base station, said mobile station comprising: means for receiving reference signals from said base station for being able to determine channel properties of a downlink channel between said base station and said mobile station; means for determining a first feedback information comprising a first component indicating a channel quality of a downlink beam with a largest received carrier power of at least three downlink beams of said downlink channel and a second component indicating said downlink beam with said largest received carrier power; and means for transmitting said first feedback information to said base station; and to an operation and maintenance centre for use in a radio communication system.

BACKGROUND OF THE INVENTION

The method of scheduling mobile stations in a radio communication system is usually performed in such a way, that the performance in terms of data throughput for the radio communication system is optimized.

In an SDMA radio communication system (SDMA=space division multiple access) multiple mobile stations can be scheduled by a base station using a MIMO technique (MIMO=multiple input multiple output) at a same frequency/time resource or same frequency/time/code resource by spatial separation of the mobile stations.

The same frequency/time resource means that two or more mobile stations receive downlink data at same frequency and same time. In this case space is used as an additional multiple access dimension instead of time and frequency to have an orthogonal component in the downlink data for crosstalk avoidance and minimised interference effects.

The same frequency/time/code resource means that two or more mobile stations receive downlink data at same frequency, same time, and same spreading code in case of a CDMA component in the downlink channel. In this case space is used as an additional multiple access dimension instead of time, frequency and code to have an orthogonal component in the downlink data for crosstalk avoidance and minimised interference effects.

In EP 1 784 032 A1 a method for determining a set of mobile stations for an identical basic resource unit in a base station is disclosed. The determination is based on uplink feedback channel information related to a transmit covariance matrix and information (e.g. estimated SINR of the mobile station receiver (SINR=signal-to-interference-plus-noise ratio)) related to a channel quality.

Feedback reporting information is used in different ways depending on radio communication system type:

In GSM or UMTS radio communication systems (GSM=Global System for Mobile Communication; UMTS=Universal Mobile Telecommunication System) for example, feedback reporting is used for adapting a downlink channel from a base station to a mobile station according to several properties of a downlink path related to the downlink channel. Such properties are for instance: distance between the base station and the mobile station, area constitution (e.g. urban, rural) between the base station and the mobile station, spectral use of the downlink path by other transmitters, speed and direction of movement of the mobile station etc. Within the scope of the feedback reporting the mobile station measures beacons or pilots of the downlink channel and reports measurement information (e.g. channel quality indicator, received signal strength indicator) via an uplink channel to the base station. The base station uses the measurement information to adapt parameters (e.g. transmission power, transmission channel) and to improve characteristics (e.g. power consumption, transmission error rate) of the downlink channel.

In SISO and SIMO radio communication systems (SISO=single input single output; SIMO=single input multiple output) using one transmitting antenna, one data signal per time unit is transmitted from the transmitting antenna resulting in a single downlink beam of the downlink channel. In such a case it is sufficient to report the channel quality indicator or the received signal strength indicator and there is no need to identify the downlink beam and to report a beam indicator for the downlink beam within the measurement information, In MISO or MIMO radio communication systems (MISO=multiple input single output) at least two transmitting antennas and one (MISO) or more (MIMO) receiving antennas are used. Separately encoded data signals can be transmitted per transmitting antenna via two or more downlink beams of the downlink channel on the same time/frequency/code-multiple access resource. In such a case, in addition to spectral noise, interference between the downlink beams occurs.

For SU-MIMO (SU=single user) in LTE Release 8 (3GPP TS 36.213 V8.2.0) single stream codebook based precoding/beamforming will be used and single user MIMO feedback information comprises three parameters: CQI (CQI=channel quality indication), PMI (PMI=precoding matrix indicator), and RI (RI=rank indication). CGI is a parameter indicating a channel quality of a downlink beam with a largest average received modulated carrier power. For LTE Release 8, the CQI parameter is an index for a transport format of the downlink channel. PMI is a parameter indicating a beam index, which corresponds to a precoding vector of the downlink beam for which the channel quality is reported. The beam index belongs to an entry of a codebook, which contains precoding vectors with all allowed Tx antenna weight combinations. RI is a parameter estimated by the mobile station indicating a number of streams for which best data throughput can be expected.

The MIMO technique described in EP 1 784 032 A1 uses multiple downlink beams, which are directed to multiple mobile stations. It is beneficial for performance and overall data throughput in a radio cell or in a sector of the radio cell, if a downlink beam directed to a specific mobile station generates as few interference as possible to downlink beams directed to other mobile stations. Therefore a base station builds a set of adequate mobile stations for a same frequency time resource. This means that the mobile stations of such a set are scheduled at a same time with a same frequency but with spatial separation of downlink beams, so that the downlink beams generate fewest interference between each other.

In US 2007/0249402 A1 a wireless communication system implements beamforming across multiple omni-directional antennas to create beams at different spatial directions. The wireless communication system allocates resources to a communication link using a combination of beam sets and substantially orthogonal resources in order to provide improved coverage without a corresponding increase in interference.

Starting from the disclosures of US 2007/0249402 A1, for building such a set of adequate mobile stations an appropriate feedback information has to be reported from the mobile stations to the base station, which should not consume too much resources of the uplink channel.

SUMMARY OF THE INVENTION

This object is achieved by a method for building sets of mobile stations in a radio communication system which comprises the steps of: transmitting reference signals from a base station for being able to determine channel properties of a downlink channel between the base station and at least two mobile stations; receiving the reference signals by the at least two mobile stations; determining a first feedback information at a first one of the at least two mobile stations and a second feedback information at a second one of the at least two mobile stations comprising each a first component indicating a channel quality of a downlink beam with a largest received carrier power of at least three downlink beams of the downlink channel and a second component indicating the downlink beam with the largest received carrier power; transmitting the first feedback information and the second feedback information from the first one and the second one of the at least two mobile stations to the base station; receiving the first feedback information and the second feedback information at the base station; and building a mobile station set of at least two of the at least two mobile stations according to the first feedback information and the second feedback information at the base station, wherein the method further comprises a minimum beam distance mode with selecting a first one and a second one of the at least three downlink beams for scheduling the at least two mobile stations and with selecting at least a third one of the at least three downlink beams spatially located between the first one and the second one of the at least three downlink beams and the third one of the at least three downlink beams is not being used for scheduling, and a fixed relations mode with the first one and the second one of the at least two mobile stations determine a channel quality with fixed relations between the at least three downlink beams based on a signal-to-interference ratio or a signal-to-interference-plus-noise ratio estimated by an output of a transceiver of the first one and the second one of the at least two mobile stations, and wherein a usage of the minimum beam distance mode or of the fixed relations mode depends on a current angular beam spread of the at least three downlink beams.

The first feedback information and the second feedback information comprise information only about one of the downlink beams. Reporting only this information reduces considerably a reporting overhead in comparison to a case, where channel quality indications for all downlink beams are reported and therewith a considerable amount of a maximum uplink capacity of a radio cell is consumed.

For example using a 3 bit codebook with 8 allowed precoding vectors, reporting only the channel quality of the downlink beam with the largest received carrier power reduces the overhead by a factor of 8 in comparison to the case where channel quality information for all downlink beams is reported.

Additional characteristics adapted to an angular spread of the downlink beams of the downlink channel are achieved by further preferred embodiments of the invention indicated by dependent claims for the method, by an independent claim for the radio communication system, by an independent claim for the base station, by an independent claim for a mobile station, and by an independent claim for an operation and maintenance centre.

The embodiments of the invention will become apparent in the following detailed description and will be illustrated by accompanying drawings given by way of non-limiting illustrations.

DETAILED DESCRIPTION OF THE INVENTION

Figure 1:
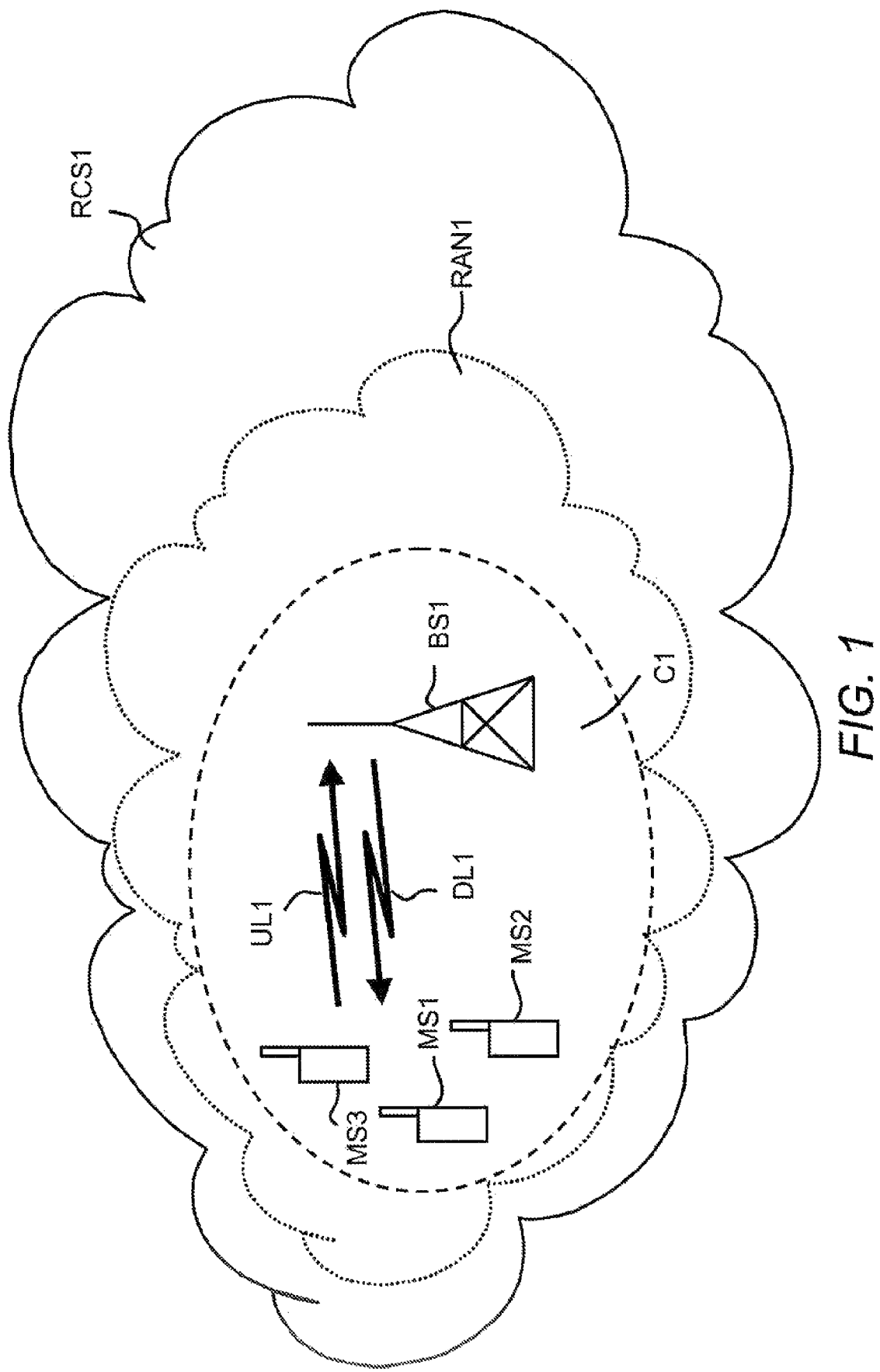
FIG. 1 shows a block diagram of a radio communication network for performing a method in accordance to a first embodiment of the invention.

Referring to FIG. 1 a first radio communication network RCS1 contains a first radio access network RAN1. The first radio access network RAN1 contains a first radio cell C1. Further radio cells of the first radio access network RAN1 are not shown for simplification.

The first radio cell C1 contains a first base station BS1, a first mobile station MS1, a second mobile station MS2, and a third mobile station MS3. Further mobile stations of the first radio cell C1 are not shown for simplification.

The first mobile station MS1, the second mobile station MS2, and the third mobile station MS3 are connected to the first base station BS1 via a first downlink channel DL1.

In addition the first mobile station MS1, the second mobile station MS2, and the third mobile station MS3 are connected to the first base station BS1 via a first uplink channel UL1. Instead of the first downlink channel DL1 and the first uplink channel UL1 also a combined channel with downlink and uplink time slots can be used. In another option the first mobile station MS1, the second mobile station MS2, and the third mobile station MS3 can be connected to the first base station BS1 via different uplink channels.

First reference signals are transmitted from the first base station BS1 via the first downlink channel DL1 to the first mobile station MS1, the second mobile station MS2, and the third mobile station MS3. First feedback information is transmitted via the first uplink channel UL1 from the first mobile station MS1 to the first base station BS1. Equally, the second mobile station MS2 transmits second feedback information and the third mobile station MS3 transmits third feedback information via the first uplink channel UL1 to the first base station BS1.

Figure 2:
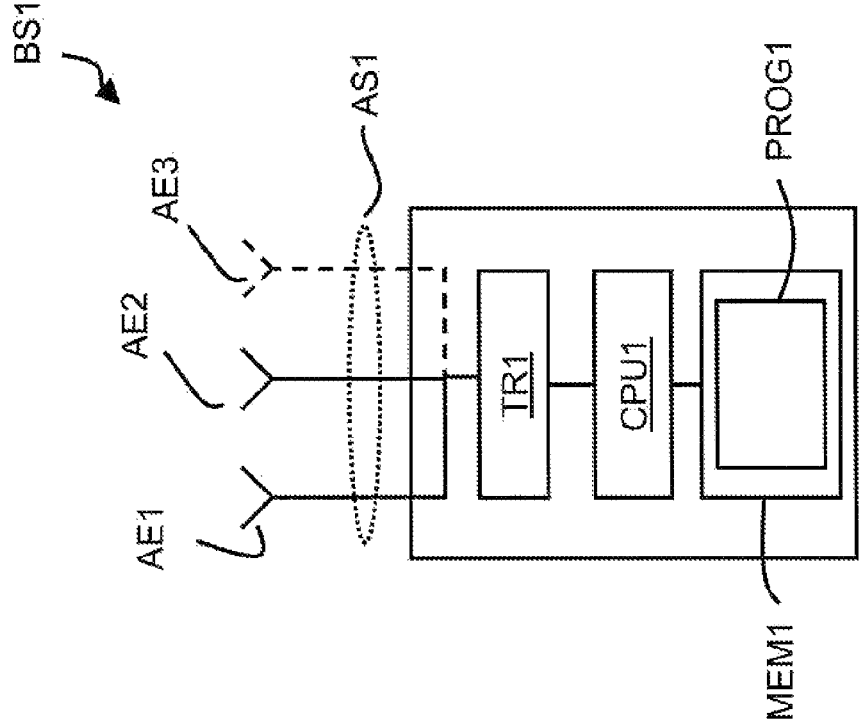
FIG. 2 shows a block diagram of a base station for performing the method in accordance to the first embodiment of the invention.

Referring to FIG. 2 the first base station BS1 of FIG. 1 contains a first antenna system AS1, a first transceiver TR1, a first CPU (CPU=central processing unit) CPU1, and a first computer readable medium MEM1.

The first antenna system AS1 contains a first antenna element AE1 and a second antenna element AE2. The first antenna system AS1 can also contain more than two antenna elements, indicated by a third antenna element AE3.

The first antenna element AE1 and the second antenna element AE2 are used for the first downlink channel DL1 and the first uplink channel UL1. Optionally the first antenna element AE1 and the second antenna element AE2 can be only used for the first downlink channel DL1 and an additional receiver antenna can be used for the first uplink channel UL1. Other mappings between the first antenna element AE1 or the second antenna element AE2 to the first uplink channel UL1 are possible.

The first transceiver TR1 transmits the first reference signals and receives the first feedback information, the second feedback information, and the third feedback information via the first antenna system AS1.

The first computer readable medium MEM1 is foreseen for storing a first computer readable program PROG1.

The first computer readable program PROG1 is foreseen for executing steps of the method according to the first embodiment of the invention. The first CPU CPU1 is foreseen for executing the first computer readable program PROG1.

Figure 3:
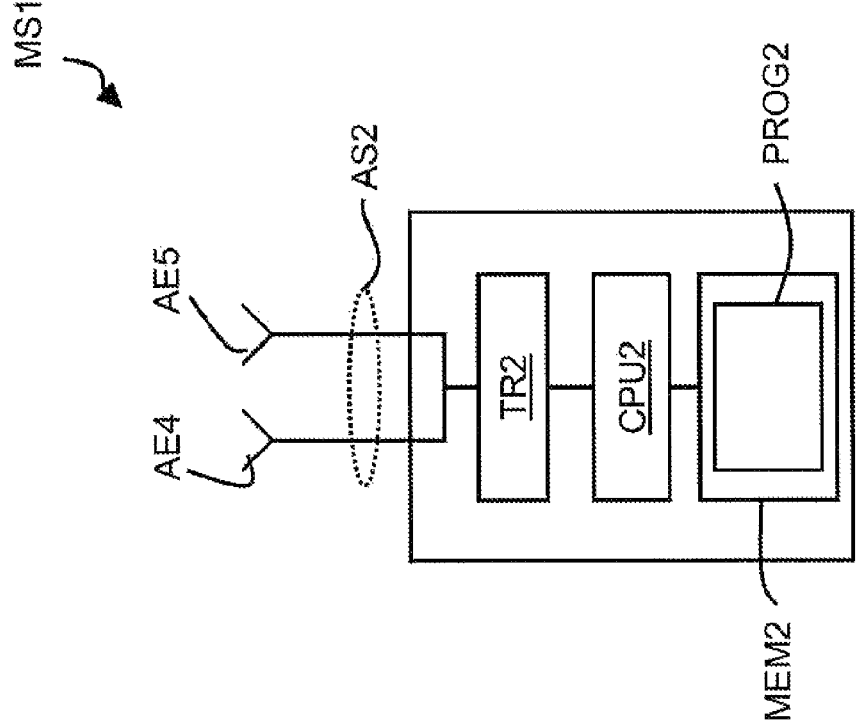
FIG. 3 shows a block diagram of a mobile station for performing the method in accordance to the first embodiment of the invention.

Referring to FIG. 3 the first mobile station MS1 of FIG. 1 contains a second antenna system AS2, a second transceiver TR2, a second CPU CPU2, and a second computer readable medium MEM2.

The second antenna system AS2 contains a fourth antenna element AE4 and a fifth antenna element AE5. The second antenna system AS2 can also contain more than two antenna elements for reception and/or transmission. But this is not shown for simplification.

The fourth antenna element AE4 and the fifth antenna element AE5 are used for the first downlink channel DL1 and the first uplink channel UL1. Alternatively a further antenna element can be used to split downlink and uplink transmission on different antenna elements.

The second transceiver TR2 receives the first reference signals and transmits the first feedback information via the second antenna system AS2. Optionally, a separate receiver is used for receiving the first reference signals and a separate transmitter is used for transmitting the first feedback information.

The second computer readable medium MEM2 is foreseen for storing a second computer readable program PROG2.

The second computer readable program PROG2 is foreseen for executing steps of the method according to the first embodiment of the invention. The second CPU CPU2 is foreseen for executing the second computer readable program PROG2.

For the following description, the second mobile station MS2 and the third mobile station MS3 contain similar components as the first mobile station MS1 with similar functions. If there is a first group of mobile stations within the first radio communication system RCS1 not having functions according to the invention and a second group of mobile stations having functions according to the invention, than the mobile stations of the first group cannot be used for an improved building of mobile station sets according to the invention and only the mobile stations of the second group are used for the improved building of mobile station sets. For the mobile stations of the first group well-known mechanisms will be used to build mobile station sets or to schedule them without using a mobile station set.

Figure 4:
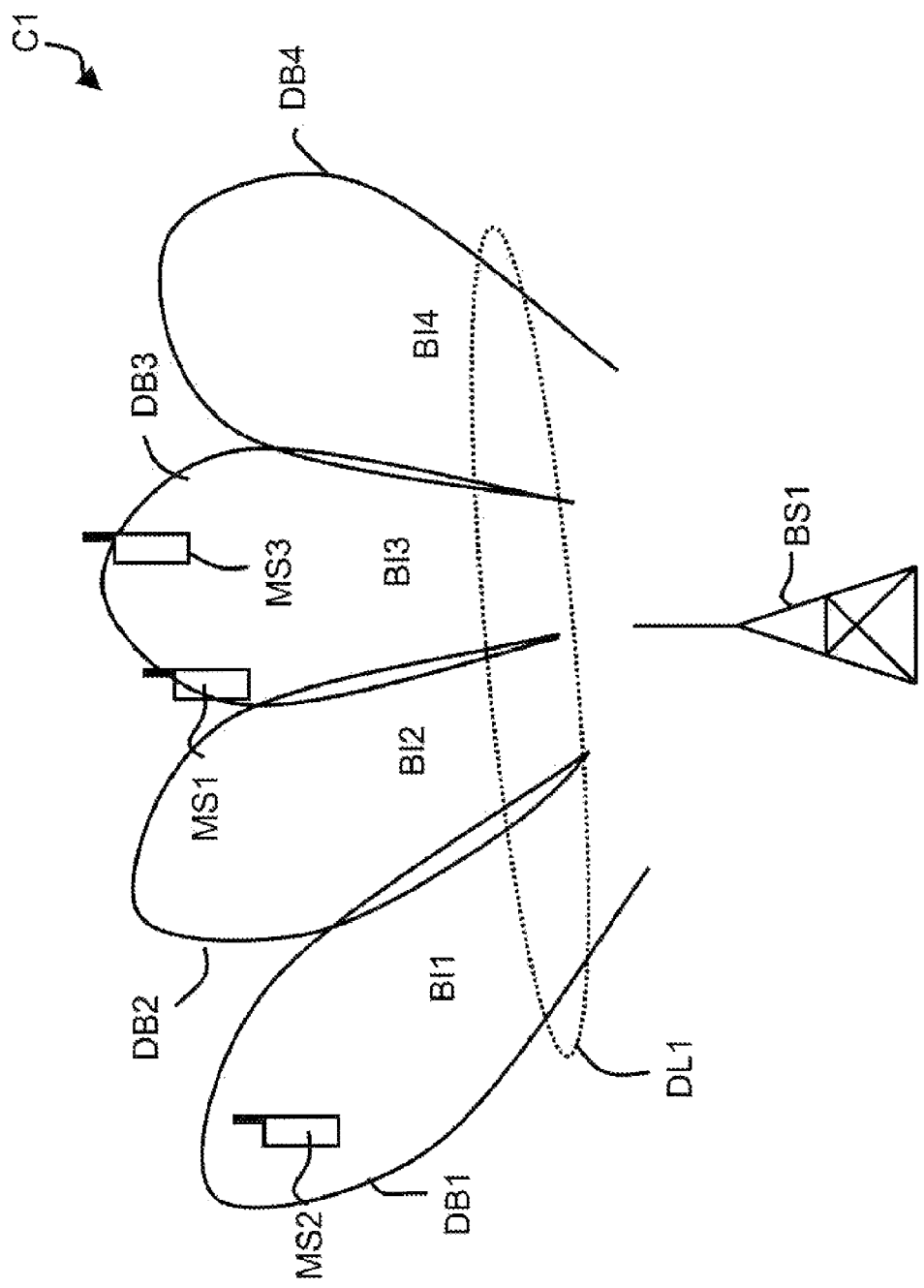
FIG. 4 shows a block diagram of a radio cell being served by the base station in accordance with the first embodiment of the invention.

Referring to FIG. 4 showing the first radio cell C1, the first downlink channel DL1 comprises exemplarily four downlink beams DB1, DB2, DB3, and DB4. The first downlink channel DL1 can also comprise further downlink beams. But this is not shown for simplification. The first downlink beam DB1, the second downlink beam DB2, the third downlink beam DB3 and the fourth downlink beam DB4 represent all allowed antenna weight combinations to be used at the first antenna system AS1. Each downlink beam DB1, DB2, DB3, and DB4 is directed towards a slightly different direction in space. In the example, the first mobile station MS1 is located within second and third coverage areas of the second downlink beam DB2 and the third downlink beam DB3, the second mobile station MS2 is located within a first coverage area of the first downlink beam DB1, and the third mobile station MS3 is located within the third coverage area of the third downlink beam DB3.

The first downlink beam DB1 is assigned a first beam index BI1, the second downlink beam DB2 is assigned a second beam index BI2, the third downlink beam DB3 is assigned a third beam index BI3 and the fourth downlink beam DB4 is assigned a fourth beam index BI4.

In a so-called codebook shown in table 1, each beam index BI1, BI2, BI3, and BI4 corresponds to an allowed antenna weight combination, equivalent to an allowed so-called precoding vector, with first Tx antenna weights (Tx=transmission) w1_i(i=1, 2, 3, 4) as first weight parameters for the first antenna element AE1 and with second Tx antenna weights w2_i(i=1, 2, 3, 4) as second weight parameters for the second antenna element AE2.

Exemplarily, first antenna weight parameter combination w1_1, w2_1 is used as a first precoding vector wBI1=(w1_1, w2_1) which corresponds to the first downlink beam DB1. Similar mappings exist for the other downlink beams DB2, DB3, and DB4.

The codebook is to be known by the first base station BS1 and by all mobile stations currently located in the first radio cell C1.

TABLE 1

| | Tx antenna weights | |
|---|---|---|
| Beam index | first weight parameters w1_i for the first antenna element AE1 | second weight parameters w2_i for the second antenna element AE2 |
| BI1 | w1_1 | w2_1 |
| BI2 | w1_2 | w2_2 |
| BI3 | w1_3 | w2_3 |
| BI4 | w1_4 | w2_4 |

Figure 5:
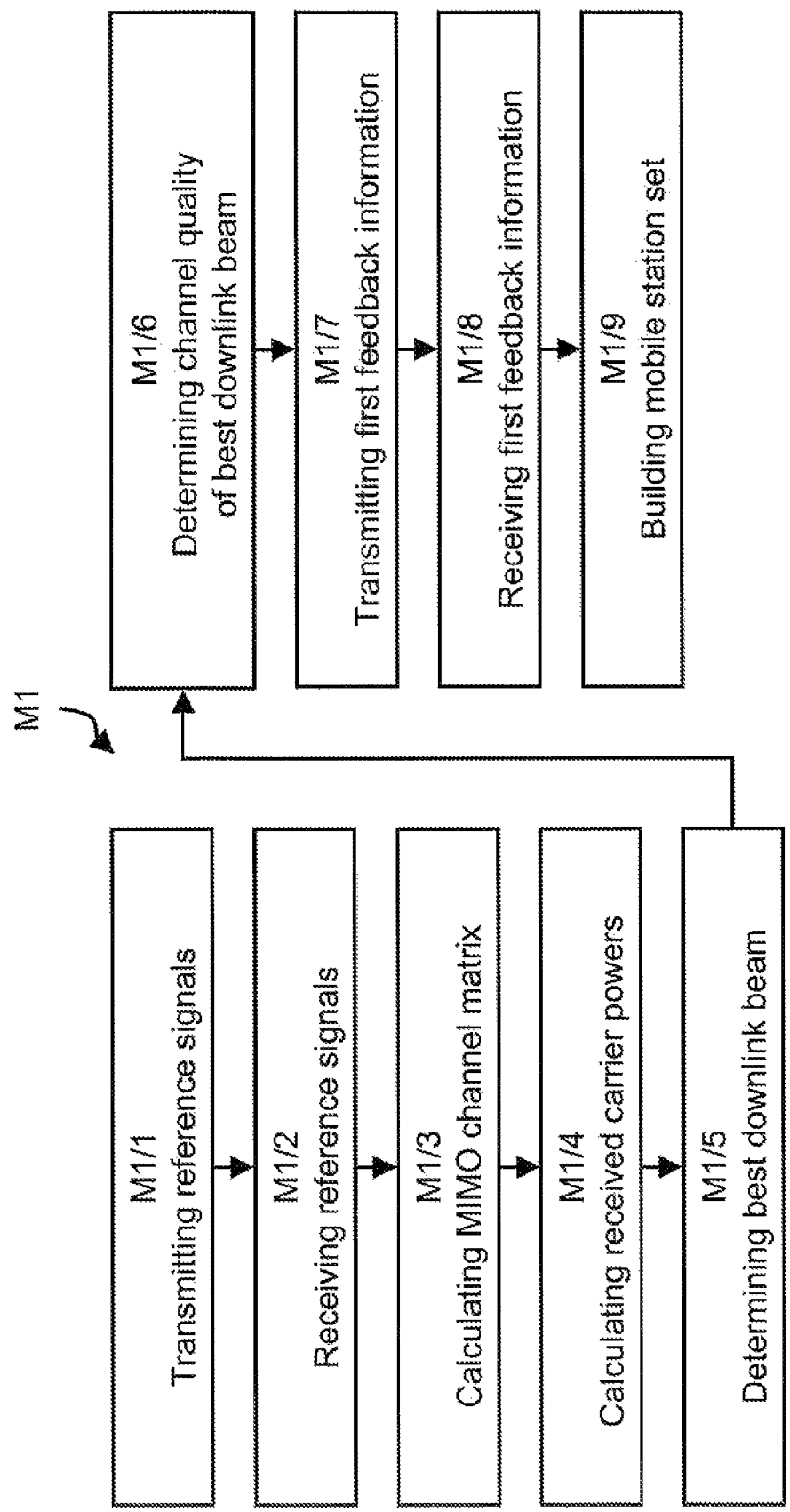
FIG. 5 shows a flow diagram of the method in accordance to the first embodiment of the invention.

FIG. 5 shows a method M1 for use in the first radio communication system RCS1 according to the first embodiment of the invention.

In step M1/1 the first base station BS1 transmits periodically the first reference signals via the first antenna element AE1 and the second antenna element AE2, whereas the first reference signals are transmitted unweighted, e.g. with a same amplitude, unvarying, e.g. with a constant amplitude, and orthogonal for both antenna elements AE1, AE2. The orthogonality of the first reference signals can be achieved for example by using different codes or different frequencies or different transmission times on both antenna elements AE1, AE2. Candidates for such first reference signals are common pilots for example as being used in an OFDM technique (OFDM=Orthogonal Frequency Division Multiplexing) for WiMAX systems (WiMAX=Worldwide Interoperability for Microwave Access). All mobile stations belonging to the first radio cell C1 of the first base station BS1 know transmit parameters of the first reference signals.

The first mobile station MS1 receives the first reference signals and determines a reception vector g=(g1,g2) of the received first reference signals in a further step M1/2. In case of an OFDM radio communication system the reception vector g is to be determined for a certain sub-carrier. Reception powers P_g1_s1 and P_g1_s2 for the first reference signals to be transmitted by the first base station BS1 via the first antenna element AE1 and the second antenna element AE2 and measured by the first mobile station MS1 via the fourth antenna element AE4 are equal to expectation values of $|g1|^2(s1)$ and $|g1|^2(s2)$ and reception powers P_g2_s1 and P_g2_s2 for the first reference signals to be transmitted by the first base station BS1 via the first antenna element AE1 and the second antenna element AE2 and measured by the first mobile station MS1 via the fifth antenna element AE5 are equal to expectation values of $|g2|^2(s1)$ and $|g2|^2(s2)$.

In a next step M1/3, the first mobile station MS1 calculates a MIMO channel matrix H. The MIMO channel matrix H is time-dependent and frequency-dependent. In case of two antenna elements AE1, AE2 at the first base station BS1 and two antenna elements AE4, AE5 at the first mobile station MS1 a relation between a known transmission vector s for the transmitted first reference signals, the reception vector g and the MIMO channel matrix H is given by following equation:

$$\underline{g} = \begin{pmatrix} g1 \\ g2 \end{pmatrix} = H * \underline{s} = \begin{pmatrix} h11 & h12 \\ h21 & h22 \end{pmatrix} * \begin{pmatrix} s1 \\ s2 \end{pmatrix}$$

Due to orthogonal transmission of the first reference signals from the antenna elements AE1, AE2 there are four equations for elements h11, h12, h21, and h22 of the MIMO channel matrix H:

$g1 = h11*s1, g2 = h21*s1$ (first reference signals sent via the first antenna element AE1)

$g1' = h12*s2, g2' = h22*s2$ (first reference signals sent via the second antenna element AE2)

The first mobile station MS1 can calculate the elements h11, h12, h21, and h22 of the MIMO channel vector H based on the reception vector g determined beforehand in the step M1/2 and based on the known transmission vector s.

In a next step M1/4, the first mobile station MS1 calculates received carrier powers P_S_i for each allowed precoding vector. Such received carrier powers P_S_i can be for example average received modulated carrier powers. The first mobile station MS1 calculates vectors h_i' of equivalent channels (also known as effective channels) for each precoding vector wBI_i(i=1, 2, 3, 4) by multiplying the calculated MIMO channel vector H with each precoding vector wBI_i (i=1, 2, 3, 4) of the table 1:

$$\underline{h\_i'} = \begin{pmatrix} h1\_i' \\ h2\_i' \end{pmatrix} = H * \underline{wBI\_i} = \begin{pmatrix} h11 & h12 \\ h21 & h22 \end{pmatrix} * \begin{pmatrix} w1\_i \\ w2\_i \end{pmatrix}, \quad i = 1 \ldots N$$

N is the number of the allowed precoding vectors and is equal to four according to the exemplary precoding vector selection of the table 1.

The average received modulated carrier powers P_S_i are obtained by calculating squared absolute values of each vector h_i' and averaging the squared absolute values over a certain time for a certain amount of first reference signals:

$$P\_S\_i = |h\_i'|^2 = (\sqrt{|h1\_i'|^2 + |h2\_i'|^2})^2, \quad i=1 \ldots N$$

In a further step M115 the first mobile station MS1 determines the downlink beam with the largest received carrier power, in the following the best downlink beam.

According to FIG. 4 the third downlink beam DB3 should be exemplarily the best downlink beam for the first mobile station MS1.

In a further step M1/6, the first mobile station MS1 determines a channel quality for the best downlink beam. An example for the channel quality is a CQI value.

For determining the CQI value the first mobile station calculates for example an SIR (SIR=signal-to-interference ratio) for the best downlink beam by using the following equation:

$$SIR = \frac{P\_S}{P\_I} = \frac{P\_S}{\sum P\_I\_j}$$

The summation is done by not adding up over an estimated average received co-channel interference power of the best downlink beam.

P_S is the average received modulated carrier power of the best downlink beam. P_I is the estimated average received co-channel interference power of all downlink beams aside from the best downlink beam transmitted from the first base station BS1 and other base stations and P_I_i is an estimated average received co-channel interference power of a single downlink beam. Such estimations are an implementation feature of each mobile station manufacturer.

As an alternative, the first mobile station MS1 calculates an SINR (SINR=signal-to-interference-plus-noise ratio) using following equation:

$$SINR = \frac{P\_S}{P\_I + P\_N} = \frac{P\_S}{\sum P\_I\_j + P\_N}$$

P_N is an estimated average noise power of noise from other radio sources. The noise is typically additive white Gaussian noise (AWGN).

Also the estimation of P_N is an implementation feature of each mobile station manufacturer.

The CQI value can be determined by the first mobile station MS1 or example by use of following table 2:

TABLE 2

| CQI value | SIR interval | | SINR interval | |
|---|---|---|---|---|
| | lower limit, ≥ | upper limit, < | lower limit, ≥ | upper limit, < |
| 1 | SIR1 | SIR2 | SINR1 | SINR2 |
| 2 | SIR2 | SIR3 | SINR2 | SINR3 |
| 3 | SIR3 | SIR4 | SINR3 | SINR4 |
| 4 | SIR4 | SIR5 | SINR4 | SINR5 |
| 5 | SIR5 | SIR6 | SINR5 | SINR6 |
| 6 | SIR6 | SIR7 | SINR6 | SINR7 |
| 7 | SIR7 | SIR8 | SINR7 | SINR8 |

For the table 2 the following relations are used:
SIR1<SIR2<SIR3<SIR4<SIR5<SIR6<SIR7<SIR8
SINR1<SINR2<SINR3<SINR4<SINR5<SINR6<SINR7<SINR8

If for example the SIR is within the interval SIR2≤SIR<SIR3 or the SINR is within the interval SINR2≤SINR<SINR3, the CQI value of the best downlink beam is 2.

The CQI value of the best downlink beam is used as a first component in the first feedback information. The beam index of the best downlink beam is used as a second component in the first feedback information.

In a further step M1/7 the first mobile station MS1 transmits the first feedback information via the first uplink channel UL1 to the first base station BS1.

In a next step M1/8 the first base station BS1 receives the first feedback information from the first mobile station MS1.

The second mobile station MS2 and the third mobile station MS3 perform the steps M1/2, M1/3, M1/4, M1/5, M1/6, and M1/7 at the same time or already have performed them or will perform them afterwards.

According to FIG. 4 the first downlink beam DB1 should be exemplarily the best downlink beam for the second mobile station MS2 and the third downlink beam DB3 should be exemplarily the best downlink beam for the third mobile station MS3.

In a further step M1/9, the first base station BS1 uses the first feedback information, the second feedback information, and the third feedback information to build at least one mobile station set with at least two mobile stations, which can be scheduled with downlink data within a same frequency/time resource or within a same frequency/time/code resource. The step M1/9 can only performed if at least two mobile stations have reported feedback information preferably within a specific time frame.

Using only indications for the best downlink beam and the channel quality for the best downlink in the first feedback information, the second feedback information, and the third feedback information reduces considerably a reporting overhead in comparison to a case, in which the mobile stations MS1, MS2, and MS3 report beam indexes and channel qualities for each downlink beam DB1, DB2, DB3, and DB4.

The building of mobile station sets according to the first embodiment of the invention with reduced feedback information in comparison to mechanisms reporting beam indexes and channel qualities for each downlink beam can be further improved by additional improvements described in the following.

Figure 6:
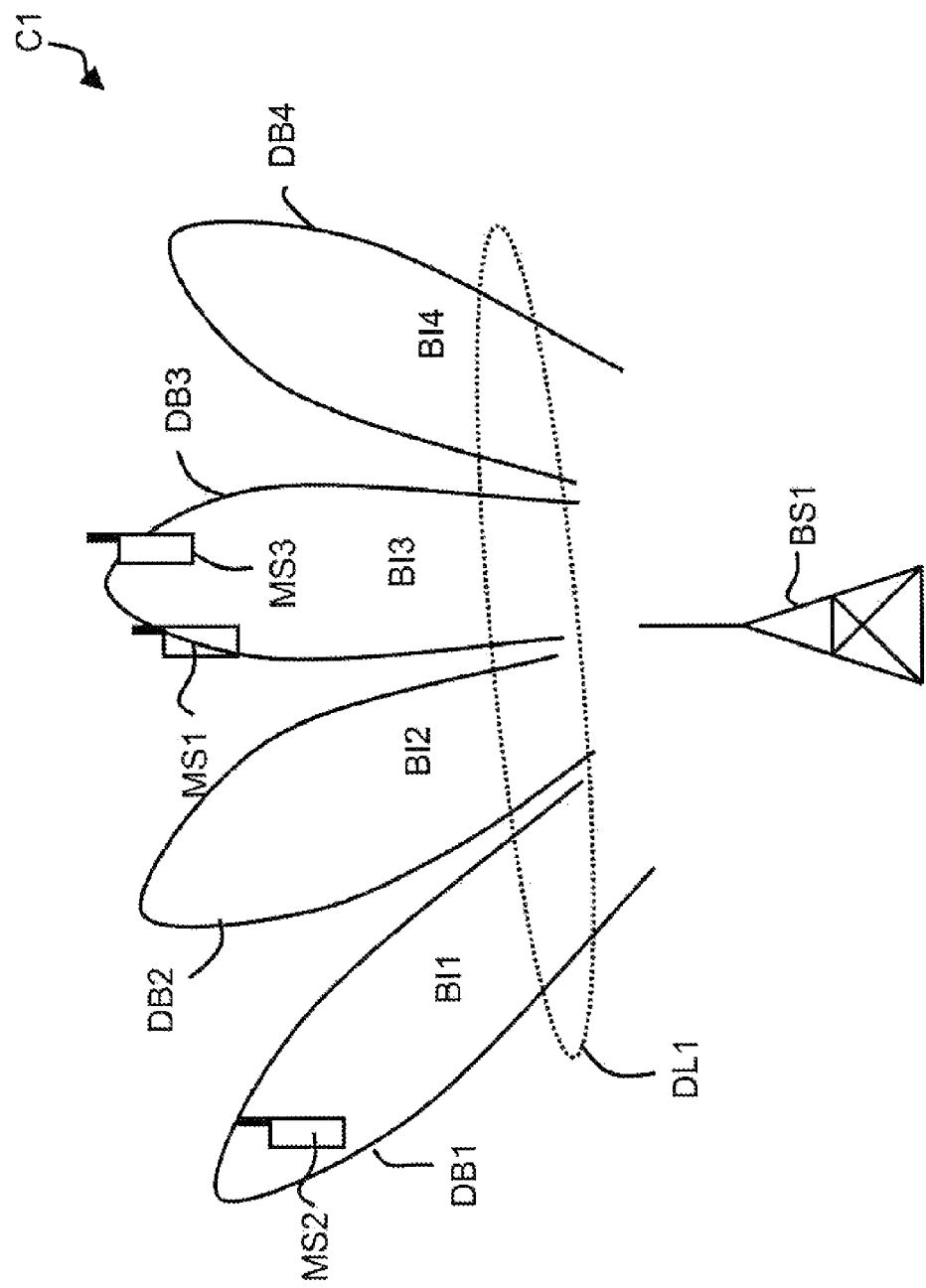
FIG. 6 shows a block diagram of the radio cell being served by the base station in accordance to further embodiments of the invention.

FIG. 6 shows the first radio cell C1 with a small angular beam spread of the downlink beams DB1, DB2, DB3, and DB4 according to further embodiments of the invention.

The elements shown in FIG. 6 that correspond to elements of the FIG. 4 have been designated by same reference numerals.

The angular beam spread is an indicator for a level of overlap between the coverage areas of adjacent downlink beams. The level of overlap depends on the landscape around the first base station BS1. If there are many obstacles around the first base station BS1 the angular beam spread will be larger (large angular beam spread) in comparison to a case with only few obstacles (small angular beam spread).

Figure 7:
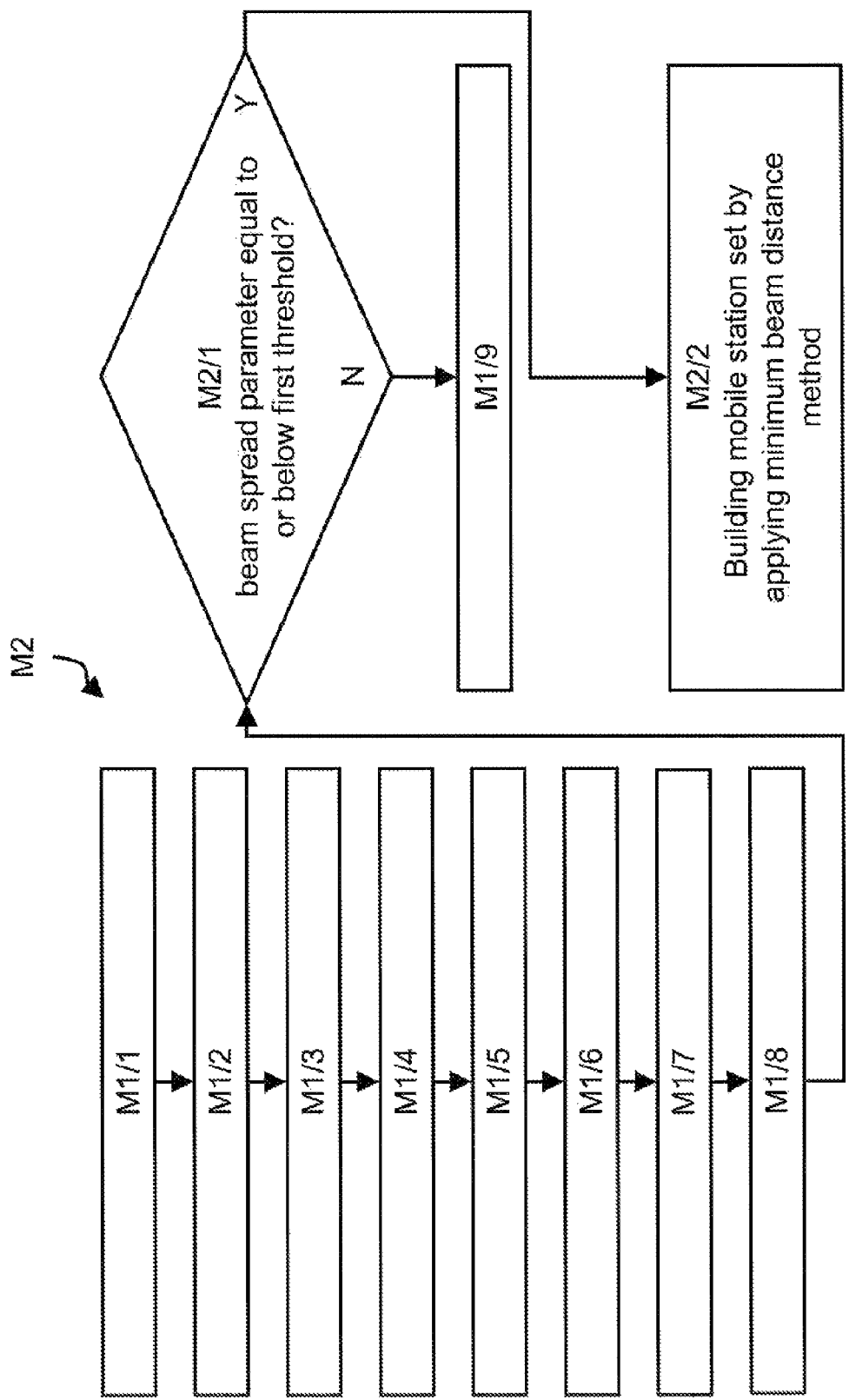
FIG. 7 shows a flow diagram of the method in accordance to a second embodiment of the invention.

FIG. 7 shows a method M2 for use in the first radio communication system RCS1. The method M2 will be used as an improvement according to a second embodiment of the invention, if a parameter describing the angular beam spread is below a first threshold value of within a first range of values. The angular beam spread depends on the inter-beam interference of the downlink beams DB1, DB2, DB3, and DB4. The parameter can be derived for example from the CQI values reported by the mobile stations MS1, MS2, and MS3.

The steps shown in FIG. 7 that correspond to the steps of the FIG. 5 have been designated by same reference numerals. In addition to the steps M1/1, M1/2, M1/3, M1/4, M1/5, M1/6, M1/7, M1/8, and M1/9 performed in the first embodiment of the invention, in the second embodiment of the invention following step M2/1 is performed after the step M1/8 and either the step M1/9 or step M2/2 is performed after the step M2/1.

In the further step M2/1 the first base station BS1 compares the parameter of the angular beam spread with the first threshold value. If the parameter is above the first threshold value the step M1/9 is the next step. If the parameter is equal to or below the first threshold value the step M2/2 is the next step.

In the step M2/2, the first base station BS1 applies for building a mobile station set a minimum beam distance method. The minimum beam distance method means that for building the mobile station set that there exists at least one further downlink beam of the downlink beams DB1, DB2, DB3, and DB4 located between a first mobile station set downlink beam, which is a downlink beam selected from the downlink beams DB1, DB2, DB3, and DB4 for a first one of the mobile stations MS1, MS2, and MS3 of the mobile station set and a second mobile station set downlink beam, which is a further downlink beam selected from the downlink beams DB1, DB2, DB3, and DB4 for a second one of the mobile stations MS1, MS2, and MS3 of the mobile station set. The at least one further downlink beam of the downlink beams DB1, DB2, DB3, and DB4 is not used for scheduling during the frequency/time resource or the frequency/time/code resource of the mobile station set.

A minimum beam distance parameter of the minimum beam distance method defines the number of adjacent downlink beams spatially located between the downlink beams of the mobile station set and not being used for scheduling during the frequency/time resource or the frequency/time/code resource of the mobile station set.

If a minimum beam distance parameter has for example the value 2, then the base station BS1 can select the second mobile station MS2 located within a first coverage area of the first downlink beam DB1 and one of the other mobile stations MS1, MS3 located within a third coverage area of the third downlink beam DB3 for a mobile station set of a same frequency/time resource or a same frequency/time/code resource. A scheduler makes a decision for allocating mobile stations to a mobile station set based on further criteria such as buffer status, channel quality, time requirements of services etc.

Intra-cell or intra-sector interference across the downlink beams used in the mobile station set can be avoided by applying the minimum beam distance method at the base station BS1 in an environment with small overlap and small crosstalk between the downlink beams DB1, DB2, DB3, and DB4.

It is a further improvement according to a third embodiment of the invention to adapt a selection of transport formats for the mobile stations of the mobile station set according to the use of the minimum beam distance method. Such adaptation should account for a transmit power split to multiple downlink beams.

Figure 8:
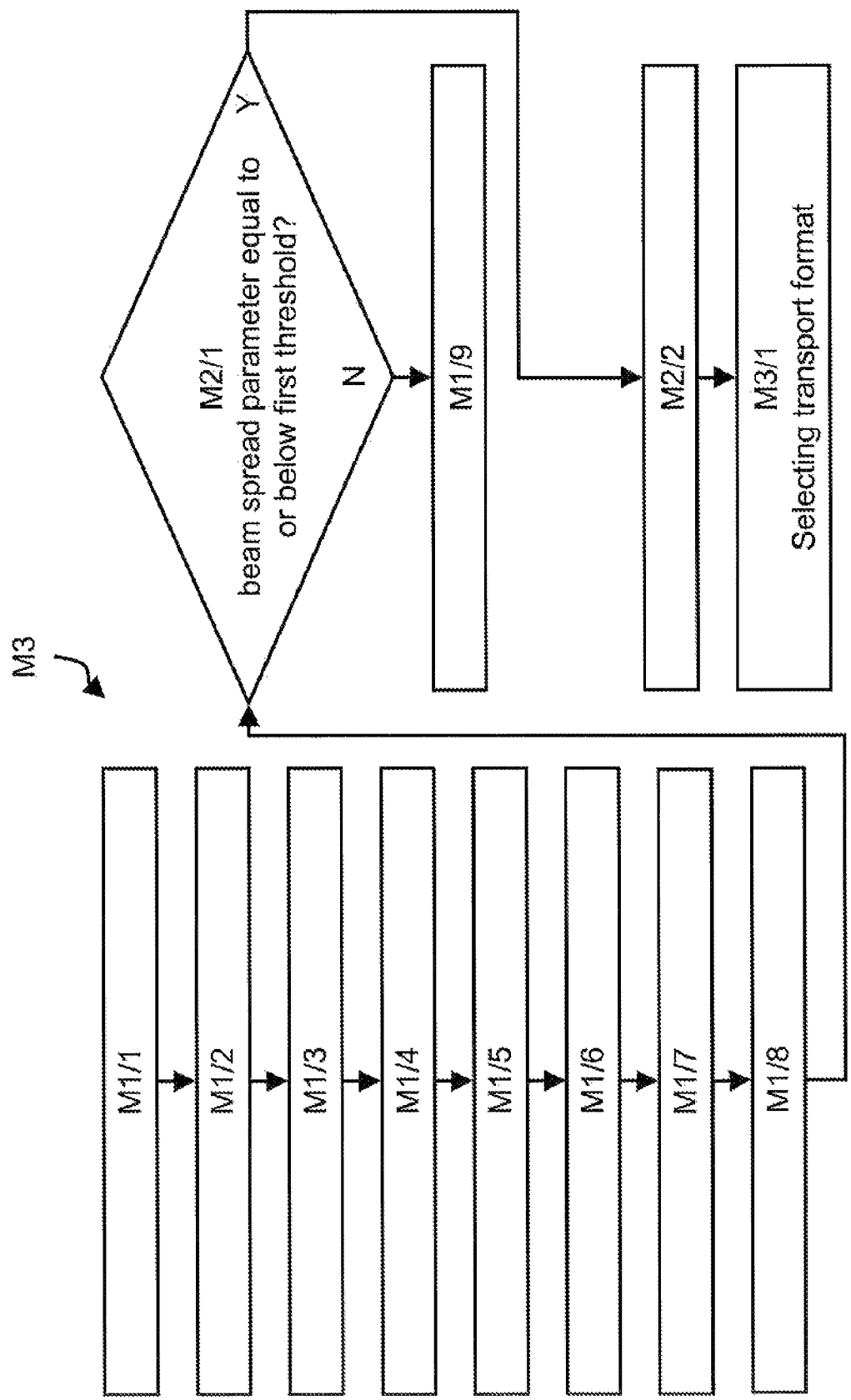
FIG. 8 shows a flow diagram of the method in accordance to a third embodiment of the invention.

FIG. 8 shows a method M3 for use in the first radio communication system RCS1 according to the third embodiment of the invention. The elements shown in FIG. 8 that correspond to elements of the FIG. 7 have been designated by same reference numerals.

In addition to the steps M1/1, M1/2, M1/3, M1/4, M1/5, M1/6, M1/7, M1/8, M1/9, M2/1, and M2/2 of the method M2 following step M3/1 is performed after the step M2/2.

In the further step M3/1, the first base station BS1 selects a transport format for each mobile station of the mobile station set according to the reported CQI values and according to a PSF parameter (PSF=power split factor). The PSF parameter is used because multiple data streams are transmitted to multiple mobile stations via multiple downlink beams in comparison to a SU-MIMO scheduling method, which uses only one data stream to one mobile station at each time.

The selection of the appropriate transport format can be based on a look-up table shown in following table 3:

TABLE 3

| Transport format/ | CQI interval | |
|---|---|---|
| MCS | lower limit, ≥ | upper limit, < |
| QPSK, coding rate ⅓ | CQI1 + PSF | CQI2 + PSF |
| QPSK, coding rate ⅔ | CQI2 + PSF | CQI3 + PSF |
| 16-QAM | CQI3 + PSF | CQI4 + PSF |
| 64-QAM | CQI4 + PSF | CQI5 + PSF |

In the first column of table 3, different transport formats respectively MCSs (MCS=modulation & coding scheme) with different coding rates are listed, wherein the maximum data throughput for a transport format or a MCS increases with increasing CQI value interval.

If for example the CQI is within the interval (CQI3+PSF) ≤C<(CQI4+PSF), the transport format/MCS 16-QAM is selected.

The additional usage of the PSF parameter for the transport format selection in MU-MIMO in comparison to SU-MIMO, where this parameter is not used, allows for a more optimised selection of a suitable transport format, if a CQI reporting method similar to SU-MIMO is also used for MU-MIMO.

The first base station BS1 can also select an adequate transport format by further taking into account an IMF parameter (IMF=interference margin factor) according to a fourth embodiment of the invention.

The selection of the appropriate transport format can be based on a look-up table shown in following table 4:

TABLE 4

| Transport format/ | CQI interval | |
|---|---|---|
| MCS | lower limit, ≥ | upper limit, < |
| QPSK, coding rate ⅓ | CQI1 + PSF + IMF | CQI2 + PSF + IMF |
| QPSK, coding rate ⅔ | CQI2 + PSF + IMF | CQI3 + PSF + IMF |
| 16-QAM | CQI3 + PSF + IMF | CQI4 + PSF + IMF |
| 64-QAM | CQI4 + PSF + IMF | CQI5 + PSF + IMF |

If for example the CQI is within the interval (CQI4+PSF+ IMF)≤CQI<(CQI5+PSF+IMF), the transport format/MCS 64-QAM is selected.

The IMF is used because even if the downlink beams DB1, DB2, DB3, and DB4 are selected with the minimum beam distance, there could be still some inter-beam interference, which requires a larger reported CQI value for being able to schedule a mobile station in MU-MIMO with a same transport format as being used for SU-MIMO.

Mobile station sets according to the second embodiment of the invention are built without specific knowledge of any interference between the downlink beams DB1, DB2, DB3, and DB4. Even if the method according to the second embodiment of the invention is used in an environment with a small angular beam spread, beam side lobes of the downlink beams DB1, DB2, DB3, and DB4 can generate interference to neighbour downlink beams. It is therefore favourable to reduce the beam side lobes by applying tapering using at least three antenna elements AE1, AE2, and AE3 of the first antenna system AS1 at the first base station BS1.

Tapering means that adequate amplitudes and phases are used at the antenna elements AE1, AE2, and AE3 for adapting the downlink beams DB1, DB2, DB3, and DB4 to have small beam side lobes for reduced interference between adjacent downlink beams.

A further improvement concerning the second, third or fourth embodiment of the invention is to use a low-complex MRC-receiver (MRC=maximal-ratio combining) in the mobile stations MS1, MS2, and MS3, because the interference between downlink beams used for scheduling mobile stations in a mobile station set is already minimised by using the minimum beam distance, the PSF or the PSF together with the AIMF at the first base station BS1.

Figure 9:
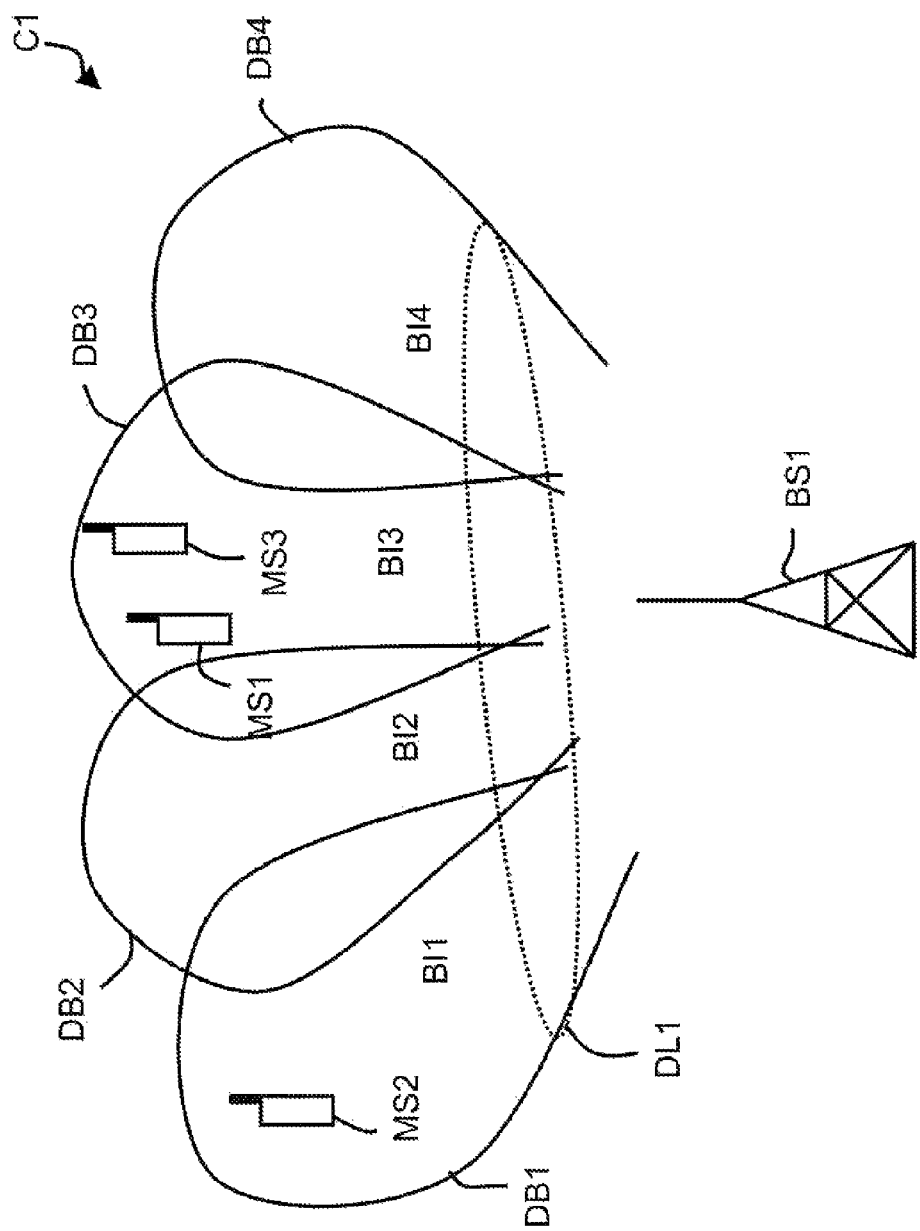
FIG. 9 shows a block diagram of the radio cell being served by the base station in accordance to yet further embodiments of the invention.

FIG. 9 shows the first radio cell C1 with a large angular beam spread of the downlink beams DB1, DB2, DB3, and DB4 according to yet further embodiments of the invention. The elements shown in FIG. 9 that correspond to elements of the FIG. 4 have been designated by same reference numerals.

Figure 10:
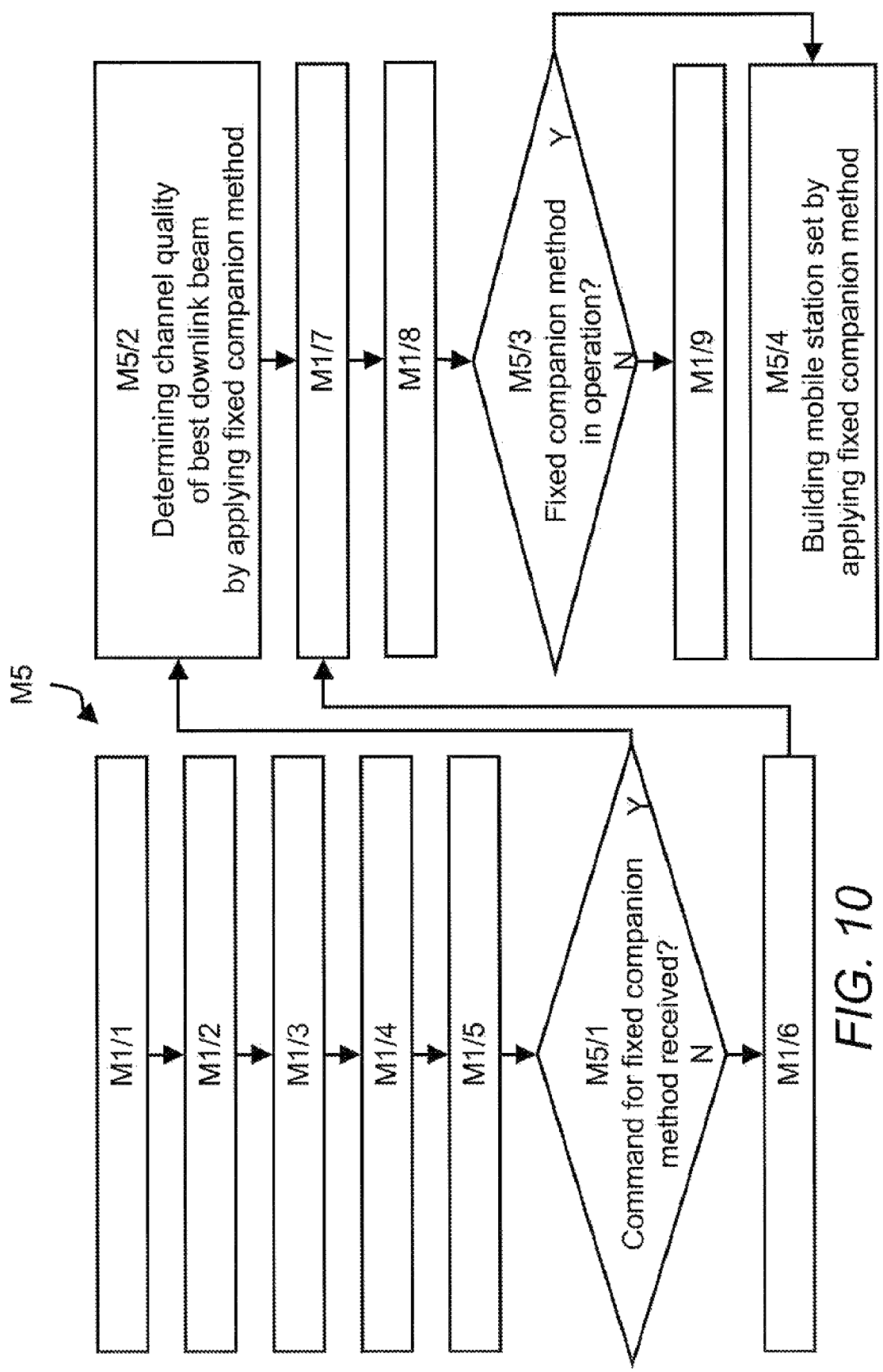
FIG. 10 shows a flow diagram of the method in accordance to a fifth embodiment of the invention.

FIG. 10 shows a method M5 for use in the radio communication system RCS1 according to a fifth embodiment of the invention. The elements shown in FIG. 10 that correspond to elements of the FIG. 5 have been designated by the same reference numerals.

In addition to the steps M1/1, M1/2, M1/3, M1/4, M1/5, M1/6, M1/7, M1/8, and M1/9 of the method M1 following step M5/1 is performed after the step M1/5, step M5/2 is performed as an alternative of the step M1/6, step M5/3 is performed after the step M1/8 and step M5/4 is performed as an alternative of the step M1/9.

In the further step M5/1, the first mobile station MS1 verifies, if it has received a command to use a fixed companion method beforehand. If no command has been received, the step M1/6 is the next step. If the command has been received, the step M5/2 is the next step.

The fixed companion method means, that for each of the downlink beams DB1, DB2, DB3, and DB4 another dedicated one of the downlink beams DB1, DB2, DB3, and DB4 exists. The other dedicated one of the downlink beams DB1, DB2, DB3, and DB4 is a fixed companion downlink beam. This relation is to be known by the first base station BS1 and the mobile stations MS1, MS2, and MS3.

The fixed companion method will be used, if the parameter for the angular beam spread has reached or is above a second threshold value or if the parameter is within a second range of values.

In the step M5/2, the first mobile station MS1 applies the fixed companion method for determining the channel quality of the best downlink beam.

To explain the fixed companion method, for example the fixed companion downlink beam of the first downlink beam DB1 is the third downlink beam DB3 and the fixed downlink beam of the second downlink beam DB2 is the fourth downlink beam DB4.

The first mobile station MS1 determines for example a CQI value based on an estimated signal-to-interference ratio or signal-to-interference-plus-noise ratio to be output by an interface of the second transceiver TR2 of the first mobile station MS1.

The CQI value is for example calculated using one of the following equations:

$$SIR = \frac{P\_S\_bestbeam}{P\_I\_fixedcompanionbeam}$$

$$SINR = \frac{P\_S\_bestbeam}{P\_I\_fixedcompanionbeam + P\_N}$$

P_S_bestbeam is for example the average received modulated carrier power of the best downlink beam (the third downlink beam DB3 in the example).

P_I_fixedcompanionbeam is for example the average received modulated carrier power of the fixed companion downlink beam (the first downlink beam DB1 in the example).

A number of fixed companion downlink beams for the downlink beams DB1, DB2, DB3, and DB4 is equal to a number of Rx antennas (Rx=reception) of the mobile stations MS1, MS2, and MS3 minus 1. This means, that for 2 Rx antennas used at the mobile stations MS1, MS2, and MS3 one fixed companion downlink beam is used. In case of 4 Rx antennas used at mobile stations three fixed companion downlink beams can be used.

In general, this takes into account a number of spatial degrees of freedom at the transceivers of the mobile stations depended on the number of Rx antennas to be used at the mobile stations.

As the second transceiver TR2 an MMSE transceiver (MMSE=minimum mean square error) for spatial stream separation can be used. Instead of the second transceiver TR2 likewise a receiver in the form of an MMSE receiver can be used. Also a zero forcing receiver or a zero forcing transceiver can be used.

In the step M5/3, the first base station BS1 verifies, if the fixed companion method is in use. If the fixed companion method is not in use, the step M1/9 is the next step. If the fixed companion method is in use, the step M5/4 is the next step.

In the step M5/4, the first base station BS1 builds the mobile station set based on the received first, second and third feedback information taking into account the fixed relations between the downlink beams (DB1, DB2, DB3, DB4) used for the reported CQI values.

An advantage of the fixed companion mechanism is the avoidance of additional feedback information for further downlink beams than the best downlink beam even if the crosstalk and the interference between the downlink beams DB1, DB2, DB3, and DB4 is large.

It is favourable if the usage of the different embodiments of the invention depends on the current angular beam spread of the downlink beams DB1, DB2, DB3, and DB4. The usage of the different embodiments of the invention is controlled by the first base station BS1. If a change of the used embodiment is favourable because for example the angular beam spread has been changed by a specific amount or has reached at least a specific threshold value, than a command to switch to another embodiment of the invention is sent from the first base station BS1 to the mobile stations MS1, MS2, and MS3.

For a better evaluation of the angular beam spread at the first base station BS1, it is favourable, that the first base station BS1 not only receives information about the best downlink beams but also at least information about another downlink beam via the first feedback information, the second feedback information, and the third feedback information.

Figure 11:
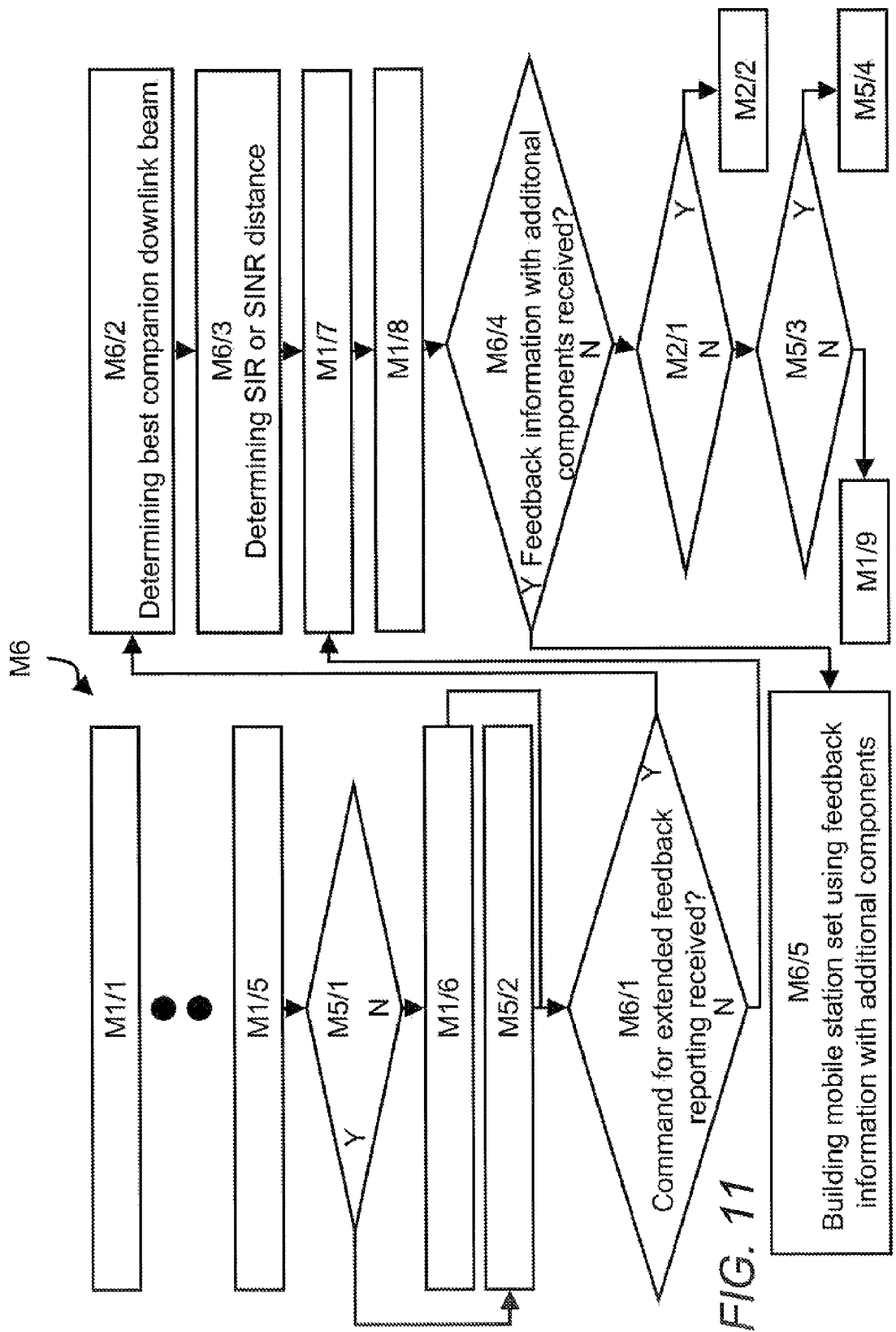
FIG. 11 shows a flow diagram of the method in accordance to a sixth embodiment of the invention.

FIG. 11 shows a method M6 for use in the first radio communication system RCS1 according to a sixth embodiment of the invention. The elements shown in FIG. 15 that correspond to elements of the FIG. 5, FIG. 7, and FIG. 10 have been designated by same reference numerals.

In addition to the steps M1/1, M1/2, M1/3, M1/4, M1/5, M1/6, M1/7, M1/8, M1/9, M2/1, M2/2, M5/1, M5/2, M5/3, and M5/4 following step M6/1 is performed after the step M1/6 or after the step M5/2, steps M6/2 and M6/3 are performed as an alternative after the step M6/1, step M6/4 is performed as an alternative after the step M2/1 and M6/5 is performed as an alternative to the step M1/9. The dots shown in FIG. 11 represent the steps M1/2, M1/3, and M1/4 not shown in the FIG. 11.

In the step M6/1 the first mobile station MS1 verifies if a command for an extended feedback reporting has been received. If no command has been received, the step M1/7 is the next step. If the command for the extended feedback reporting has been received, the step M6/2 is the next step.

In the step M6/2, the first mobile station MS1 determines a downlink beam with a fewest received carrier power, a best companion downlink beam in the following.

In the step M6/3 the first mobile station MS1 determines an SIR distance value SIR_dist or an SINR distance value SINR_dist of the best downlink beam with reference to the best companion downlink beam.

The first mobile station MS1 uses for calculation of the SIR distance value SIR_dist for example following equation:

$$SIR\_dist = \frac{P\_S\_bestbeam}{P\_S\_bestcompanionbeam}$$

P_S_bestbeam is for example the average received modulated carrier power of the best downlink beam and P_S_bestcompanionbeam is for example the average received modulated carrier power of the best companion downlink beam.

For the SINR distance value SINR_dist the first mobile station MS1 uses for example following equation:

$$SINR\_dist = \frac{P\_S\_bestbeam}{P\_S\_bestcompanionbeam + P\_N}$$

The steps M6/2 and M6/3 can also be executed by the first mobile station MS1 from time to time based on a periodic timer expiry, a random process, or another mechanism.

In the step M1/7, the first mobile station MS1 transmits the first feedback information to the first base station BS1. In addition to the first component and the second component, the beam index of the best companion downlink beam is used as a third component and the SIR distance value SIR_dist or the SINR distance value SINR_dist is used as a fourth component of the first feedback information.

In the step M1/8, the first base station BS1 receives the first feedback information with the additional third component and the additional fourth component.

The second mobile station MS2 and the third mobile station MS3 generate the second feedback information and the third feedback information accordingly.

In the step M6/4, the base station BS1 verifies if the feedback information with additional components has been received. If the feedback information with no additional components has been received, the step M2/1 is the next step. If the feedback information with additional components has been received, the step M6/5 is the next step.

In the step M6/5, the first base station BS1 builds the mobile station set based on the received first, second and third feedback information taking into account the third component and the fourth component of the first, second, and/or third feedback information.

An advantage of the SIR distance values or SINR distance values to be reported in the first, second, and/or third feedback information is, that the values can be used to determine for example the level of the angular beam spread of the downlink beams DB1, DB2, DB3, and DB4. The level of the angular beam spread is compared with different threshold values to be applied for the different embodiments of the invention. If the angular beam spread undercuts or surpasses a threshold, than the first base station BS1 makes a decision to exchange the currently used embodiment of the invention by another embodiment of the invention.

It is favourable to use the extended feedback reporting, if the parameter for the angular beam spread is between the first threshold value and the second threshold value.

Figure 12:
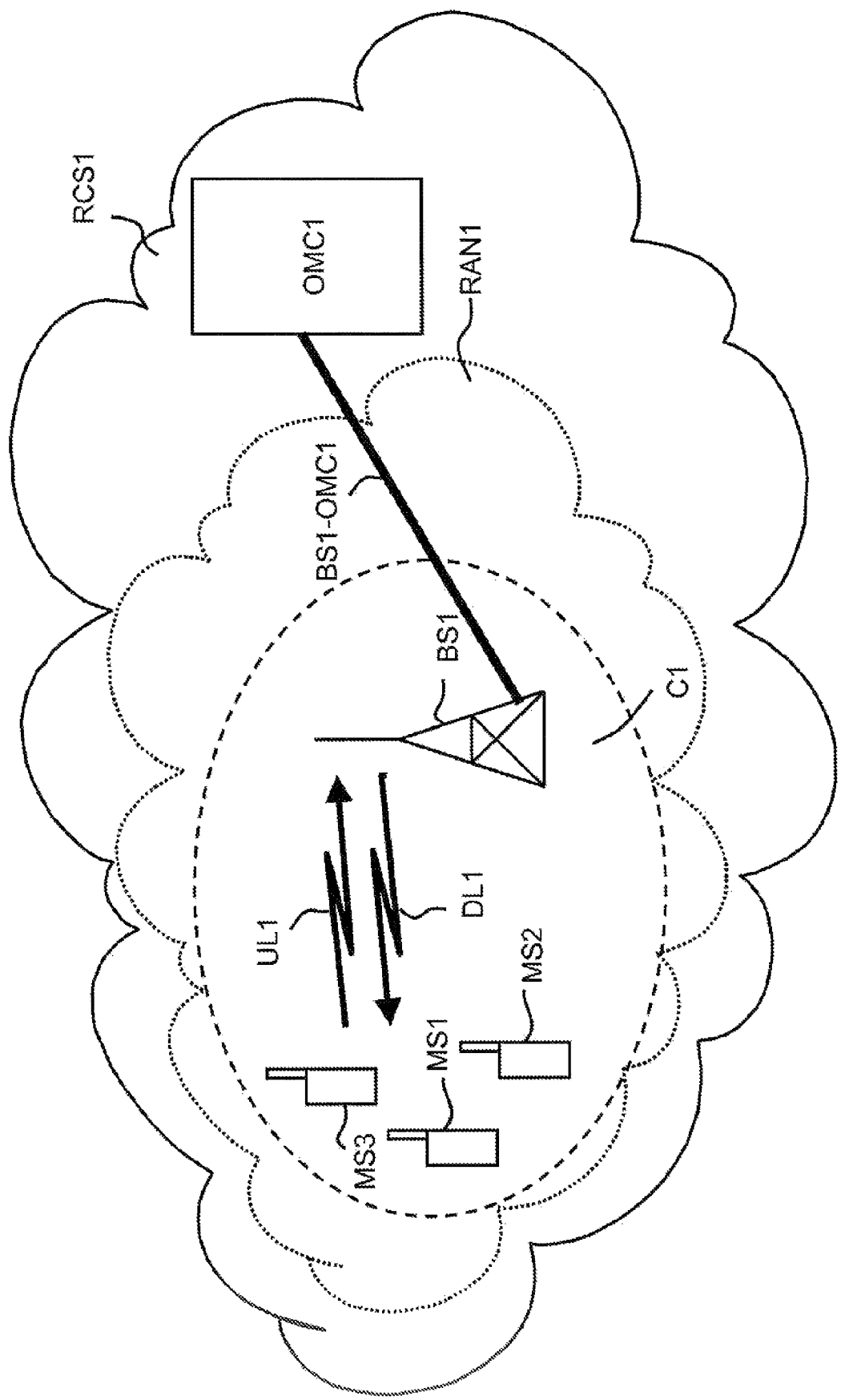
FIG. 12 shows a block diagram of a radio communication network for performing a method in accordance to a seventh embodiment of the invention.

Referring to FIG. 12 the first radio communication network RCS1 contains the first radio access network RAN1 and an OMC (OMC=operation and maintenance centre) OMC1 according to a seventh embodiment of the invention. The elements in the embodiment shown in FIG. 12 that correspond to elements of the embodiment of FIG. 1 have been designated by same reference numerals.

The OMC OMC1 is connected to the first base station BS1 via a connection line BS1-OMC1.

Figure 13:
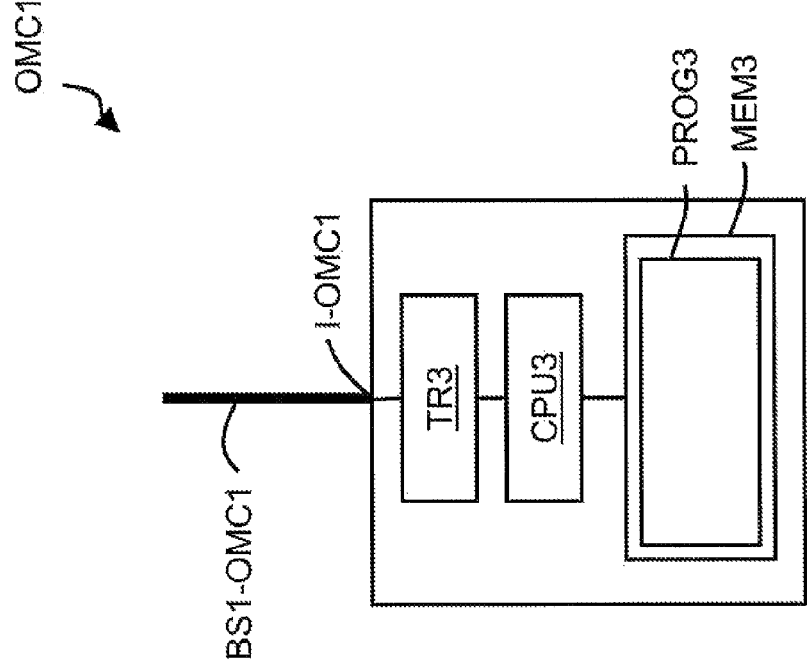
FIG. 13 shows a block diagram of a base station for performing the method in accordance to the seventh embodiment of the invention.

Referring to FIG. 13 the OMC OMC1 of FIG. 12 contains an interface I-OMC1 to the connection line BS1-OMC1, a third transceiver TR3, a third CPU CPU3, and a third computer readable medium MEM3.

The third transceiver TR3 transmits configuration commands via the connection line BS1-OMC1 to the first base station BS1 and receives confirmation messages via the connection line BS1-OMC1 from the first base station BS1.

The third computer readable medium MEM3 is foreseen for storing a third computer readable program PROG3. The third computer readable program PROG3 contains means for adapting feedback configuration parameters and feedback operation modes of the first base station BS1.

The third computer readable program PROG3 is foreseen for executing steps of a method according to the seventh embodiment of the invention. The third CPU CPU3 is foreseen for executing the third computer readable program PROG3.

The OMC OMC1 determines at least one of the feedback configuration parameters of the first base station BS1. Such feedback configuration parameters are for example the first threshold, the second threshold, the first range of values, the second range of values, the power split factor parameter, and the interference margin factor parameter. Furthermore, the OMC OMC1 can specify which feedback operation mode according to the embodiments of the invention must be used at the first base station BS1 and the mobile stations MS1, MS2, and MS3 connected to the first base station BS1.

The OMC OMC1 transmits the feedback reporting configuration parameters and/or the feedback operation mode to the first base station BS1. For the further operation, the first base station BS1 uses the feedback reporting configuration parameters and/or the feedback operation mode to be determined by the OMC OMC1 to set for example the feedback reporting mode of the first radio cell C1 or a sector of the first radio cell C1.

Depended on an environment (e.g. rural, urban) of a radio cell or a sector of a radio cell, on a cell size, on an antenna deployment above/below rooftop or based on measurements of average long-term channel properties it is favourable to use different feedback reporting modes by different base stations in a permanent way. Also for optimisation purposes it is advantageous to be able to configure the feedback reporting configuration parameters of base stations per remote control by use of the OMC OMC1.

The invention claimed is:

1. A method for building sets of mobile stations in a radio communication network, said method comprising:
    transmitting reference signals from a base station for being able to determine channel properties of a downlink channel between said base station and at least two mobile stations;
    receiving said reference signals by said at least two mobile stations;
    determining a first feedback information at a first one of said at least two mobile stations and a second feedback information at a second one of said at least two mobile stations comprising each a first component indicating a channel quality of a downlink beam with a largest received carrier power of at least three downlink beams of said downlink channel and a second component indicating said downlink beam with said largest received carrier power;

transmitting said first feedback information and said second feedback information from said first one and said second one of said at least two mobile stations to said base station;

receiving said first feedback information and said second feedback information at said base station; and building a mobile station set of at least two of said at least two mobile stations according to said first feedback information and said second feedback information at said base station, wherein said method further comprises:

employing a minimum beam distance mode with selecting a first one and a second one of said at least three downlink beams for scheduling said at least two mobile stations and with selecting at least a third one of said at least three downlink beams spatially located between said first one and said second one of said at least three downlink beams and said third one of said at least three downlink beams is not being used for scheduling, and employing a fixed relations mode with said first one and said second one of said at least two mobile stations determine a channel quality with fixed relations between said at least three downlink beams based on a signal-to-interference ratio or a signal-to-interference-plus-noise ratio estimated by an output of a transceiver of said first one and said second one of said at least two mobile stations, employing said minimum beam distance mode or said fixed relations mode as a function of a current angular beam spread of said at least three downlink beams.

2. The method according to claim 1, wherein said parameter is a CQI value.

3. The method according to claim 1, further comprising building a mobile station set of at least two of said at least two mobile stations according to said first feedback information and said second feedback information at said base station, when at least two mobile stations have reported feedback information within a specific time frame.

4. The method according to claim 1, wherein said minimum beam distance mode is applied when an angular beam spread of said at least three downlink beams undercuts a first threshold value or is within a first range of values.

5. The method according to claim 4, wherein the extended feedback reporting is used when a parameter of the angular beam spread is between the first threshold value and the second threshold value.

6. The method according to claim 1, wherein said minimum beam distance mode further comprises:

selecting a transport format for said first one and said second one of said at least two mobile stations by taking into account a power split factor parameter or the power split factor and an interference margin factor parameter.

7. The method according to claim 1, wherein said base station applies tapering for lowering beam side lobes of said at least three downlink beams using at least three antenna elements of an antenna system of said base station when said minimum beam distance mode is applied.

8. The method according to claim 1, wherein said fixed relations mode is applied when an angular beam spread of said at least three downlink beams surpasses a second threshold value or is within a second range of values.

9. The method according to claim 1, wherein when a command for an extended feedback reporting has been received at said first one and said second one of said at least two mobile stations, said method further comprises:

determining a further downlink beam with a fewest received carrier power and determining a signal-to-interference ratio information or a signal-to-noise-plus-interference ratio information according to said downlink beam with the largest received carrier power and said further downlink beam with the fewest received carrier power; and said first feedback information and said second feedback information further comprises a third component indicating the further downlink beam with the fewest received carrier power of said at least three downlink beams and comprises a fourth component indicating the signal-to-interference ratio information or the signal-to-noise-plus-interference ratio information according to said downlink beam with the largest received carrier power and said further downlink beam with the fewest received carrier power, and said base station switches between said minimum beam distance mode, said fixed relations mode, and a mode with feedback information further comprising said third component and said fourth component dependent on said current angular beam spread of said at least three downlink beams transmitted from said base station.

10. The method according to claim 1, wherein an operation and maintenance center configures said minimum beam distance mode, said fixed relations mode, or a mode with feedback information further comprising said third component and said fourth component at said base station.

11. A base station for use in a radio communication system, said base station being a serving base station of at least two mobile stations, said base station comprising:

a transmitter that transmits reference signals for determining channel properties of a downlink channel between said base station and said at least two mobile stations;

a receiver that receives a first feedback information of a first one of said at least two mobile stations and a second feedback information of a second one of said at least two mobile stations each comprising a first component indicating a channel quality of a downlink beam with a largest received carrier power of at least three downlink beams of said downlink channel and a second component indicating said downlink beam with said largest received carrier power; and wherein the base station is configured to build a mobile station set of at least two of said at least two mobile stations according to said first feedback information and said second feedback information at said base station, whereby said base station further is configured to apply a minimum beam distance mode with selecting a first one and a second one of said at least three downlink beams for scheduling said at least two mobile stations and with selecting at least a third one of said at least three downlink beams spatially located between said first one and said second one of said at least three downlink beams and said third one of said at least three downlink beams is not being used for scheduling; and wherein the base station is configured to take into account a fixed relations mode with said first one and said second one of said at least two mobile stations determining a channel quality using a fixed relations mode with fixed relations between said at least three downlink beams based on a signal-to-interference ratio or a signal-to-interference-plus-noise ratio estimated by an output of a transceiver of said first one and said second one of said at least two mobile stations; and wherein the base station is configured to employ a said minimum beam distance mode or said fixed relations mode as a function of a current angular beam spread of said at least three downlink beams.

12. A base station according to claim 11, wherein the base station is implemented in a radio communication system comprising a radio access network with at least two mobile stations, each mobile station comprising:

a receiver that receives reference signals from said base station for determining channel properties of a downlink channel between said base station and said mobile station;

wherein each mobile station is configured to generate a first feedback information comprising a first component indicating a channel quality of a downlink beam with a largest received carrier power of at least three downlink beams of said downlink channel and a second component indicating said downlink beam with said largest received carrier power; and a transmitter that transmits said first feedback information to said base station;

wherein each mobile station is further configured to determine a channel quality using a fixed relations mode with fixed relations between said at least three downlink beams based on a signal-to-interference ratio or a signal-to-interference-plus-noise ratio estimated by an output of a transceiver of said first one and said second one of said at least two mobile stations and wherein a usage of said fixed relations mode depends on a current angular beam spread of said at least three downlink beams.

13. A mobile station for use in a radio communication system, said mobile station being served by a base station, said mobile station comprising:

a receiver that receives reference signals from said base station for being able to determine channel properties of a downlink channel between said base station and said mobile station;

wherein the mobile station is configured to generate a first feedback information comprising a first component indicating a channel quality of a downlink beam with a largest received carrier power of at least three downlink beams of said downlink channel and a second component indicating said downlink beam with said largest received carrier power; and a transmitter that transmits said first feedback information to said base station;

whereby said mobile station is further configured to determine a channel quality using a fixed relations mode with fixed relations between said at least three downlink beams based on a signal-to-interference ratio or a signal-to-interference-plus-noise ratio estimated by an output of a transceiver of said first one and said second one of said at least two mobile stations and wherein a usage of said fixed relations mode depends on a current angular beam spread of said at least three downlink beams.

14. An operation and maintenance center for use in a radio communication system, comprising:

wherein said operation and maintenance center is configured to configure and/or select at a base station a minimum beam distance mode with selecting a first one and a second one of at least three downlink beams for scheduling at least two mobile stations and with selecting at least a third one of said at least three downlink beams spatially located between said first one and said second one of said at least three downlink beams and said third one of said at least three downlink beams is not being used for scheduling, or a fixed relations mode with fixed relations between said at least three downlink beams for determining a channel quality based on a signal-to-interference ratio or a signal-to-interference-plus-noise ratio estimated by an output of a transceiver of one of said at least two mobile stations for building sets of mobile stations; and wherein when configuring and/or selecting the minimum beam distance mode or the fixed relations mode, the operations and maintenance center is further configured to take into account a current angular beam spread of downlink beams transmitted from said base station.

* * * * *